United States Patent Office 3,089,708
Patented May 14, 1963

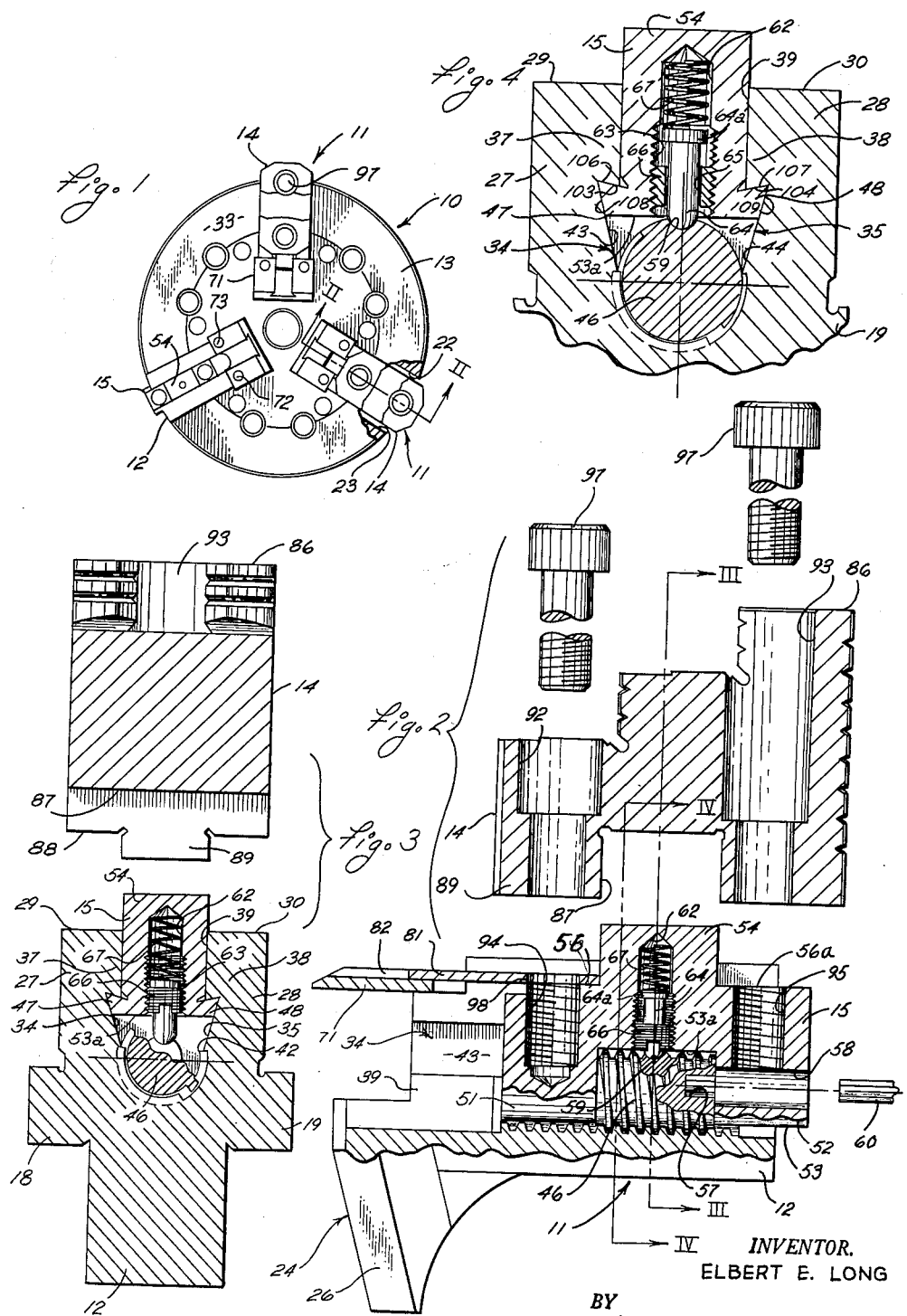

3,089,708
JAW KEY NUT
Elbert E. Long, Kalamazoo, Mich., assignor to Buck Tool Company, Kalamazoo, Mich., a corporation of Michigan
Filed Apr. 4, 1962, Ser. No. 185,038
7 Claims. (Cl. 279—123)

This invention relates to an improved, releasable, nut-type gripping structure and, more particularly, relates to an improved gripping structure for selectively locating the jaws of a chuck in fixed, but radially adjustable, positions with respect to the chuck body.

This invention is an improvement on the subject matter of patent application Serial No. 102,847, filed April 13, 1961, by Russell E. Buck, and assigned to assignee of the present invention.

The afore-mentioned application discloses a chuck construction in which each of the chuck jaws is mounted for adjustment along its associated jaw base in a direction radially of the chuck body. The jaw base itself is closely slidably mounted within a guideway in the chuck body for radial movement with respect thereto in response to the operation of power-operated means. The jaw base has a radially elongated channel or slot in its axially outer surface, which channel opens in an axial direction away from the face of the chuck body. A key member is closely slidably mounted in the channel for movement radially of the chuck body. Screw means are provided between the jaw base and the key member for effecting radial movement of the key member with respect to the jaw base. A chuck jaw is mounted on the key member for movement therewith so that the radial position of said chuck jaw with respect to the jaw base can be adjusted.

Gripping structure is provided to releasably secure the key member and thereby the chuck jaw in the desired adjusted position on the jaw base. Such gripping structure includes flanges or rails on the key member, which flanges are received in grooves extending sidewardly from the channel in the jaw base. Fasteners, such as lock bolts, are utilized to draw the gripping flanges into tight engagement with the walls of said grooves to thereby lock the key member and the chuck jaw in fixed, but releasable, position on the jaw base.

In the aforesaid application, the gripping flanges have co-planar upper surfaces which extend transverse to the center line of the channel and which snugly engage flat, co-planar walls of the afore-mentioned grooves. In theory, the gripping force is directed normal to the surfaces and, thus, there should be no force urging the side walls of the channel or slot away from each other and away from the key member. However, it has been observed in practice that there is a definite tendency for the side walls of the channel or slot to flex so that they diverge outwardly with respect to each other. Under certain circumstances, such divergency of the side walls of the channel may be sufficient to cause the jaw base to bind within the guideway in the chuck body within which the jaw slides. This interference with the necessary radial movement of the jaw base with respect to the chuck body renders the chuck jaw construction of the afore-mentioned application less than completely satisfactory for its intended purposes.

The reasons why this divergency occurs are not clearly understood, but it appears that the flanges on the key member are capable of flexing to a minor extent with respect to the main body portion of the key member. This flexing may be caused at least in part by the reliefs provided at the juncture of the gripping flanges with the main body portion of the key member. The result is that the gripping force has a component directed along the mating surfaces of the flanges and the grooves, instead of being directed only normal thereto, and this component, even though minor in amount causes the divergency above referred to. The reliefs cannot be eliminated without risking the possibility of binding occurring between the key member and the jaw base. The necessary clearances, minor manufacturing inaccuracies, which might make the mating surfaces non-planar, and wear the parts as a result of use, all may contribute to this problem.

Accordingly, it is an object of this invention to provide an improved gripping structure, particularly intended for releasably holding the jaws of a chuck in fixed, but radially adjustable, position with respect to a chuck body.

It is a further object of the invention to provide an improved gripping structure, as aforesaid, in which the walls of the jaw base defining the channel or slot within which the chuck jaw is capable of moving, are urged toward each other so that binding between said walls and the guideway in the chuck body is eliminated.

It is a further object of this invention to provide an improved structure, as aforesaid, which can be provided without any material increase in manufacturing costs and which can be used without sacrificing any of the advantages of the structure disclosed in the aforesaid application.

Other objects and advantages of the invention will become apparent to persons acquainted with equipment of this type upon reading the following descriptive material and inspecting the accompanying drawings.

In the drawings:

FIGURE 1 is a broken, axial end view of a power chuck having jaw assemblies embodying the invention.

FIGURE 2 is a partially exploded, sectional view of the chuck jaw assembly taken along the line II—II in FIGURE 1.

FIGURE 3 is a sectional view taken along the line III—III in FIGURE 2.

FIGURE 4 is an enlarged fragment of FIGURE 3.

For convenience in description, the terms "upper," "lower" and words of similar import will have reference to the chuck jaw assembly as appearing in FIGURES 2, 3 and 4. The terms "inner," "outer" and derivatives thereof will have reference to the geometric center of the chuck jaw assembly or the chuck body supporting same. The term "axially" and derivatives thereof will have reference to the central geometric axis of the chuck body.

*General Description*

The invention described herein is intended to solve the above-discussed problems by providing downwardly and inwardly converging surfaces on certain engaging walls or surfaces of the key member and the jaw base in which the key member is supported. The engaging surfaces converge at substantially identical angles, and said surfaces are preferably sloped at angles of about 20 degrees from a horizontal plane. Thus, when these surfaces are brought into gripping engagement, the convergency thereof creates a component of the gripping force which urges the side walls of the jaw base toward each other.

*Detailed Description*

The power chuck 10 (FIGURE 1) includes three chuck jaw assemblies 11 (FIGURES 2 and 3) each of which may embody the preferred form of the invention. Each jaw assembly 11 is comprised of a jaw base 12, which is radially slidably disposed within the chuck body 13 (FIGURE 1) for radial movement with respect thereto in any conventional manner. A top jaw 14 is supported upon each jaw base 12 and is interconnected therewith by means including a key member 15.

The jaw base 12 (FIGURES 2 and 3) includes a pair of parallel and integral rails or flanges 18 and 19 which project from, and extend along, opposite sides of said base intermediate top and bottom edges thereof. Said rails are slidably receivable into grooves 22 and 23, respectively (FIGURE 1) in the chuck body 13 for restricting the movement of the jaw base 12 to radial movement with respect to said chuck body. A T-shaped member 24 (FIGURE 2) having an inwardly and upwardly sloping flange 26, is secured to (usually integral with) and extends inwardly from the inner end of the jaw base 12 for engagement in a substantially conventional manner by power actuated means, not shown, for effecting said radial movement of the jaw base 12 with respect to the chuck body 13.

The jaw base 12 has a pair of spaced, integral and substantially parallel wall members 27 and 28 which project upwardly and, in this particular embodiment, have upper edges 29 and 30 lying substantially within a plane parallel with the axial end surface 33 of the chuck body 13, when said jaw base 12 is supported in said chuck body. The wall members 27 and 28 have in their opposing faces parallel grooves 34 and 35, respectively, which are preferably spaced equidistantly from and parallel with the upper edges 29 and 30, respectively. Thus, the grooves 34 and 35 create a pair of ridges 37 and 38 which project inwardly toward each other from said wall members 27 and 28, respectively, adjacent said upper edges 29 and 30.

The wall members 27 and 28 (FIGURE 3) define between them a channel 39 into which the grooves 34 and 35 open. The opposing walls 43 and 44 of the grooves 34 and 35, respectively, converge toward the bottom wall 42, which defines a portion of a cylinder extending through an arc of approximately 180 degrees. The arcuate bottom wall 42 (FIGURE 2) is threaded for threaded engagement of a screw 46 disposed within said channel adjacent said lower wall.

The key member 15 (FIGURE 3) has a pair of parallel, sidewardly projecting rails 47 and 48 on opposite sides thereof which are snugly and slidably receivable into the grooves 34 and 35, respectively, at the same time. The key member 15 has a pair of spaced abutments 51 and 52 (FIGURE 2) which extend downwardly into the recess 43 when the rails 47 and 48 are disposed within the grooves 34 and 35. The screw 46 is snugly and rotatably disposed between the abutments 51 and 52 for threaded engagement with the threads in the bottom wall 42, while the upper surface of said screw 46 slidably engages the bottom wall 53a of the key member 15 between the abutments 51 and 52.

The key member 15 (FIGURE 2) includes an upwardly projecting, lock element 54 which extends substantially above the plane defined by the upper edges 29 and 30 (FIGURE 3) of the wall members 27 and 28. The upper surfaces 56 and 56a on opposite sides of the lock element 54 (FIGURE 2) are spaced downwardly from said upper edges 29 and 30.

The screw 46 (FIGURES 2) has a coaxial wrench socket 57 in the axial end thereof adjacent the abutment 52. An access opening 58 extends through the abutment 52 in axial alignment with the socket 57 for the reception of a wrench 60 to engage the socket 57 and thereby rotate the screw 46.

The screw 46 (FIGURE 4) has a detent recess 59 in its peripheral threaded surface between the ends thereof. The key member 15 has a vertical, downwardly opening recess 62 (FIGURE 2) with a threaded lower portion 63 in which a set screw 66 is threadedly disposed. The screw 66 has a vertical, cylindrical opening 65 within which a detent pin 64 is slidably disposed. The lower end of the pin 64 in receivable into the detent recess 59 of the screw 46 when said screw is in the proper rotational position. A spring 67 is held under compression between the upper closed end of the recess 62 and the upper end of the pin 64 whereby said pin 64 is resiliently urged downwardly against said screw 46. A circular, coaxial flange 64a on the upper end of the detent pin 64 prevents the pin from passing entirely through the opening 65 in the set screw 66.

A lower dust shield 71 (FIGURE 2) is secured to the inner ends of the wall members 27 and 28 near to and parallel with, but spaced downwardly from, the upper edges 29 and 30 thereof, so that said shield lies substantially within a plane parallel with and adjacent to said axial end surface 33 (FIGURE 1) of the chuck body 13. The dust shield 71 is removably mounted upon said wall members 27 and 28 by the screws 72 and 73 (FIGURE 1). An upper dust shield 81 is slidably disposed in an undercut groove 82 in the upper surface of the lower dust shield 71. The dust shields 71 and 81 are constructed so that their upper surfaces are preferably coplanar with each other and with the top surface 56a on the outer side of the lock element 54.

The dust shield 71 (FIGURE 2) moves with the jaw base 12 and with respect to the chuck body 13 to cover continuously the opening in the end surface 33 between the inner end of said jaw base 12 and the opposing portion of the chuck body 13. When the key member 15 is moved with respect to the jaw base 12, the dust shield 81 moves with said key member to cover continuously the inner end of the channel 39 between the inner end of the key member 15 and the outer edge of the dust shield 71.

The top jaw 14 (FIGURES 2 and 3) has a stepped upper surface 86 for effecting both inside and outside engagement with a workpiece in a conventional manner. The lower side of said top jaw 14 has a transversely extending notch 87 into which the lock element 54 is snugly and slidably receivable for holding said top jaw against movement with respect to the key member 15 in a direction radially of the chuck body 13. Said top jaw 14 has a downwardly projecting, integral slide 89 which extends lengthwise of said jaw intermediate the lateral edges of the downwardly facing surface 88. Said slide 89 is split by the notch 87 and is snugly and slidably receivable into the upper end of the channel 39 on opposite sides of the lock element 54 for the purpose of positively preventing relative sidewise movement between the top jaw 14 and the jaw base 12. The slide 89 projects downwardly from the lower surface 88 a distance which is slightly less than the distance between the plane of the upper edges 29 and 30, and the top surface 56a of the key member 15 or the uppermost surfaces of the dust shields 71 and 81. Thus, the lower surface of the slide 89 is spaced from the adjacent portions of the key member 15 when both are properly disposed within the channel 39.

The top jaw 14 (FIGURE 2) has a pair of smooth bore bolt openings 92 and 93 which extend downwardly through said top jaw on the left and right sides, respectively of the notch 87. The bolt openings 92 and 93 are enlarged at their upper ends in a conventional manner to receive the heads of the machine screws 97. The key member 15 has threaded openings 94 and 95 on opposite sides of the lock element 54 for threadedly receiving said machine screws. As shown in FIGURE 2, the upper dust shield 81 is provided with an opening 98 through which the machine screw 97 can be slidably received. When the machine screws 97 are received into the bolt openings 92 and 93 and threadedly engaged with the threaded openings 94 and 95, the tightening of these bolts will cause the lower surface 88 on the top jaw 14 to tightly engage the upper edges 29 and 30 on the wall members 27 and 28, and will cause the upper edges of the rails 47 and 48 to engage tightly the downwardly facing sides of the ridges 37 and 38. By this action, the ridges 37 and 38 will be gripped snugly between the rails 47 and 48 on the key member 15 and the lower surface 88 on the top jaw 14, whereby both the top jaw 14 and the key member 15 will be rigidly held against the movement with respect to the jaw base 12 and/or the chuck body 13.

Except for the channel 39 and key member 15, the chuck structure described thus far corresponds, at least in substance, to that disclosed and claimed in application, Serial No. 102,847. The present invention provides improvements in said channel 39 and key member 15, particularly, to prevent distorting of the wall members 27 and 28 whereby they diverge outwardly when the rails or flanges 47 and 48 are urged against the ridges 37 and 38 by the screws 97.

Specifically and for this purpose, the downwardly facing sides 103 and 104 of the ridges 37 and 38 slope downwardly and inwardly, so that they define acute angles with the adjacent side walls of the channel 39. In a preferred embodiment, said angles are each about 70 degrees. The upwardly facing sides 106 and 107 of the rails 47 and 48 slope downwardly and inwardly at the same angle as the surfaces 103 and 104, so that they are tightly and respectively engageable to hold the key member 15 slidably within the jaw base 12 and, at the same time, oppose movement of the walls 27 and 28 away from each other.

That is, when the surfaces 103 and 104 are pressed against the surfaces 106 and 107, the gripping force therebetween will have a component urging the wall members 27 and 28 toward each other. Such component will be sufficient to prevent outward movement of the wall members 27 and 28 and thereby avoid binding of the rails 18 and 19 in the guideways defined by grooves 22 and 23 in the chuck body.

The side walls 43 and 44 of the grooves 34 and 35 converge downwardly at an included angle of about 30 degrees. The side walls 108 and 109 of the rails 47 and 48 converge downwardly at the same angle. The rails 47 and 47 fit within the grooves 34 and 35 with only sufficient clearance to make it possible for the rails to be moved along the ridges 37 and 38 within the grooves 34 and 35 when it is desired to adjust the key member 15 with respect to the jaw base 12.

*Operation*

The chuck jaw assemblies 11 (FIGURES 1 and 2) are placed in operating position by sliding the key member 15 endwise into the channel 39 while rotataing the screw 46 by means of the wrench 60, which is inserted through the opening 58 in the abutment 52 and into the socket 57. The dust shield 81 is mounted within the groove 82 in the dust shield 71 after which said dust shields are mounted upon the key member 15 and jaw base 12, respectively. Machine screws 97 are inserted through the bolt openings 92 and 93 and into the threaded openings 94 and 95 to the point where the top jaw 14 is snugly and slidably held upon the jaw base 12. Said top jaw 14 can be precisely located upon said jaw base by means of indices, not shown, which are scribed in corresponding, adjacent portions of the top jaw 14 and the jaw base 12. The bolt 97 in the opening 95 is shorter than the bolt in opening 94 to avoid obstruction of the wrench opening 58. With the parts thus positioned, the detent pin 64 will be received into the detent recess 59 on the screw 46 in the key member 15.

The top jaws 14 in each jaw assembly 11 can now be moved as desired or required, after the bolts 97 are loosened slightly, so that they are in proper positions for engaging the particular workpiece involved. Movement of each top jaw 14 is effected by rotating the screw 46 with the wrench 60 through the same number of revolutions, whereby the concentric relationship of the circle defined by the work engaging surfaces on the top jaws 14 is accurately maintained. Specifically, this is accomplished by counting the clicks which occur each time the pin 64 drops into the recess 59 as the screw 46 is being rotated. Each top jaw 14 is moved with respect to its jaw base 12 until the same number of clicks is heard.

It will be apparent that, by providing various desired numbers of circumferentially aligned, detent recesses 59 around the screw 46, clicking sounds can be produced by partial, such as half or quarter, rotations of the screw 46. In one particular embodiment of the invention, the lead of each screw 46 is such that one revolution thereof moves the key member 15, hence the top jaw 14, one eighth of an inch lengthwise of the jaw base 12. Accordingly, by placing aligned detent recesses 59 at 90 degree intervals around the circumference of the screw 46, movement in the amount of one thirty-second of an inch can be effected between the key member 15 and the jaw base 12 between each click of the pin 64 into a said recess 59.

After each key member 15, hence its top jaw 14, has been placed in the desired position, the machine screws 97 are firmly tightened within the threaded openings 94 and 95 whereby the ridges 37 and 38 in the wall members 27 and 28 are gripped and held between the key member 15 and top jaw 14 to prevent relative movement between the top jaw 14 and the jaw base 12. Thus, the gripping force applied by the top jaw 14 to the workpiece is transferred directly to the jaw base 12 without subjecting the threads on the screws 46 to any material amount of shearing force. The chuck 10 can now be operated in a substantially conventional manner.

When it becomes necessary or desirable to change the location of the top jaws 14 for gripping a workpiece of a different size or shape, such can be accomplished quickly and easily by loosening slightly the machine screws 97 and thereafter rotating each screw 46 until the key member 15 and top jaw 14 thereof are moved into their new positions. Thereafter the machine screws 97 are again tightened and the chuck jaw is again ready for operation.

Although a particular preferred embodiment of the invention has been disclosed in detail above for illustrative purposes, it will be understood that variations or modifications of such disclosure, which come within the scope of the appended claims, are fully contemplated.

What is claimed is:

1. A gripping structure, comprising:
   a base having upstanding walls defining an upwardly opening slot therein, the opposing surfaces of said walls having horizontal grooves communicating with said slot, said grooves having inwardly and downwardly converging surfaces each defining a small acute angle with a horizontal plane;
   a key member having a body portion receivable into said slot and snugly engaged thereby, said key member having sidewardly extending flanges snugly receivable into said grooves, said flanges having downwardly converging gripping surfaces adapted for location snugly adjacent the converging surfaces of said grooves whereby, when said key member is disposed in said slot and is urged upwardly with respect to said base, said upstanding walls are held by engagement between said gripping surfaces and said converging surfaces against deflection away from each other.

2. A gripping structure according to claim 1, in which the slot and said grooves are elongated in a direction parallel with said plane, and said key member and said flanges are movable in said direction along said slot.

3. A gripping structure according to claim 1, in which said converging surfaces of said grooves extend at an angle of about 20 degrees to said plane, and said gripping surfaces of said flanges extending at substantially the same angle to said plane.

4. In a jaw structure for a chuck which comprises a jaw base having walls defining an axially open, radially elongated slot therein, said slot having sidewardy extending grooves along the axially inner end thereof, a key member having a main body part received in said slot for radial, sliding movement and having sidewardly extending flanges at its axially inner end which flanges are received in said grooves, a chuck jaw secured to said key member, screw means for effecting radial movement of said key member along said slot and means for moving said key member in an axial direction within said slot to move said flanges axially within said grooves to releasably secure said key member to said jaw base, the improvement in the structure for releasably securing said key member in non-adjustable position within said slot which comprises:

axially inwardly converging surfaces defining the axially outer edges of said grooves, said surfaces being disposed at a small angle to a plane perpendicular to the axis of the chuck;

gripping surfaces on the flanges opposed to and adapted for gripping engagement with said converging surfaces of said grooves, said gripping surfaces converging axially inwardly at substantially the same angle as said converging surfaces of said grooves so that when said gripping surfaces are brought into engagement with said converging surfaces of said grooves, said walls will be urged toward each other.

5. A jaw structure as defined in claim 4 in which the surfaces defining the opposing walls of said grooves, and the sidewalls of said flanges adjacent said opposing walls extend at corresponding large angles to said plane.

6. The structure of claim 4 wherein the screw means includes a screw radially disposed with respect to said chuck within said slot and adjacent said key member; and wherein said key member and said screw have co-operating detent means for indicating the relative radial movement between the jaw base and the key member.

7. A chuck construction, comprising:

a chuck body having radially extending guideways therein;

jaw structures mounted in each of said guideways, said jaw structures each including a jaw base slidable in each of said guideways, said jaw base having axially extending, spaced walls extending axially out of said guideway and defining a radial slot;

a jaw mounted in said slot in said jaw base for radial movement with respect to said jaw base;

co-operating surfaces on siad jaw and said jaw base for releasably locking said jaw to said jaw base, said co-operating surfaces including engageable portions for urging said walls toward each other to prevent said walls from binding in said guideway.

References Cited in the file of this patent
UNITED STATES PATENTS

| | | |
|---|---|---|
| 1,628,476 | Sloan | May 10, 1927 |
| 2,917,314 | Ponting | Dec. 15, 1959 |
| 2,950,117 | Walmsley | Aug. 23, 1960 |